United States Patent Office 2,895,853
Patented July 21, 1959

2,895,853

SILOXANE WATER REPELLENT TREATMENT FOR FIBROUS MATERIALS

Donald L. Bailey, Snyder, and Edward R. York, Endwell, N.Y., assignors to Union Carbide Corporation, a corporation of New York No Drawing. Application May 3, 1955
Serial No. 505,841

15 Claims. (Cl. 117—155)

This invention relates to the use of certain linear polysiloxanes as textile water repellents. More particularly the invention is concerned with imparting water repellency to fabrics, paper and the like by the application thereto of fast curing, hydrophobing copolymers of dimethylsiloxane and dihydrogensiloxane. The copolymers may be prepared by either cohydrolysis of the individual silanes or equilibration of polysiloxanes.

It is, of course, well known that various polymeric siloxanes, i.e. silicones, may be employed advantageously to impart water repellency to textile fabrics, paper products and the like. Typical of the materials which may be employed for this purpose are the products resulting from the cohydrolysis and condensation of monomethyldichlorosilane and dimethyldichlorosilane such as is described in U.S. Patents Nos. 2,662,039 and 2,588,365, and others. Advantages described for the silicone type of waterproofing agent are numerous, and particularly as applied to the synthetics such as nylon, orlon, acetate rayon. Moreover, substantial advantages lie in an improvement in the "ironability" of the fabrics treated in the elimination of so-called "mark-off" which is the appearance of lines in a treated fabric after the same has been folded or otherwise wrinkled, in the resiliency of the treated fabric, etc. These are very real improvements and hydrophobing materials of this type have in recent years found a ready market.

One area for necessary improvement of silicone products of this type lies not so much in their ultimate effectiveness as in their original application and curing rate. Thus, an important factor in the application of textile treating materials prepared from polysiloxanes of the type described lies in the length of time required for the so-called cure of the material on the goods whether it be textile or paper products. The term "cure" refers to the setting and insolubilization of the polymer on the fabric, probably by interaction of the silanic hydrogen with the fabric surfaces. Cure is ordinarily effected by subjecting the treated fabric or paper to a relatively high temperature for a substantial period of time. Thus, for example, it is not uncommon to heat a treated fabric to a temperature of 150° C. or higher for a period of time as long as one-half hour or even more. Considerable room for improvement lies in an ability to cure at a lower temperature and/or in a shorter time. It has now been discovered that the temperature at which the cure may be effected and the length of time the material must be heated may both be materially reduced by selection of particular monomers for use in the preparation of the copolymer ultimately employed. As will be demonstrated hereinafter, the particular linear copolymers resulting are excellent hydrophobing agents which cure rapidly at relatively low temperatures. The advantage of a moderate cure temperature when treating heat sensitive materials such as fabric or paper is, of course, obvious.

Now in accordance with the present invention, the novel water repellent materials may be prepared by cohydrolyzing dimethyldichlorosilane with dichlorosilane in a ratio of from about 3 to about 50 parts of the dialkylchlorosilane to 1 part of the dichlorosilane and preferably from about 3 to about 15 parts of the dimethyldichlorosilane to 1 part of the dichlorosilane or by equilibrating mixtures of certain cyclic polysiloxanes of the type hereinafter described.

Copolymers prepared in accordance herewith may be represented by the following general formula:

$$(R_3SiO)_z[(Me_2SiO)_x(H_2SiO)_y](SiR_3)_z$$

wherein R is a monovalent hydrocarbon radical which may be alkyl, aryl, alkylaryl, aralkyl or cycloalkyl, $x$ is a positive integer from 5 to about 1000 or higher and preferably from about 10 to about 100, $y$ is a positive integer from 1 to about 500, and preferably from about 3 to about 30. $z$ must be 0 or 1. The lower values of $x$ and $y$ should be chosen so as to provide a polymer of sufficiently high molecular weight that volatility is low and loss during cure is prevented. Of course the term "Me" where employed herein refers to the methyl radical, $CH_3—$.

It should be understood that in the preparation of copolymers of this general type from the respective silanes, trifunctional impurities such as $(HSiO_{3/2})$ may be present in an amount as high as 20 wt. percent. The presence of such material does not appear to adversely affect the product but when it is present the viscosity of the ultimate product must ordinarily be adjusted by the use of a so-called end-blocker such as trimethylchlorosilane or the like. Trifunctional impurities of the type described need not be present in the dichlorosilane and it is, accordingly, possible to prepare the copolymers of the present invention with pure dichlorosilane and the dimethyldichlorosilane. When such pure materials are employed (and there is not present a trifunctional material of the type defined) then the requirement for the presence of end-blockers is greatly reduced and the products prepared without same may be employed directly as water repellents. It should be emphasized that when the trifunctional material is present in the copolymerizing mixture that an end-blocking material must be employed to stabilize the product and adjust the viscosity. The end-blocker may, of course, be employed in accordance herewith even with those copolymers prepared from the pure materials in the absence of a trifunctional silane. As will be described in detail hereinafter, the preparation of trifunctional material-free polysiloxanes from the respective cyclic polysiloxanes is an excellent method of producing the materials of the present invention.

The preparation of the textile water repellents of the present invention may be carried out at a temperature of from about 0° C. or below to about room temperature. Low temperatures may be attained by contact cooling, for example, the presence of ice, or it may be obtained by the controlled evolution of hydrogen chloride from the copolymerizing mixture. The use of the evolution of hydrogen chloride as the cooling means is preferred in accordance herewith but equally satisfactory results may be obtained by the use of ice or other cooling material in the mixture. Other runs have been made successfully by precooling the reaction mixture to Dry Ice temperature, i.e. —78° C. Still others have been made at temperatures varying all the way from Dry Ice temperature to room temperature.

As indicated above the mole ratios of the dimethyldichlorosilane to the dichlorosilane may vary over a relatively wide range and in experimental work ratios of from about 3 to 1 to 50 to 1 have been found entirely satisfactory. It is preferred generally to employ a ratio of from about 3 to 1 to about 15 to 1.

Now in accordance with a preferred method of preparation the hydrolysis of an ether-dimethyldichlorosilane mixture with water is carried out until the evolution of hydrogen chloride gas has lowered the reaction mixture to about 0° C. At that point the necessary dichlorosilane and trimethylchlorosilane, if employed, are then added to the reactor contents and the hydrolysis completed with all of the components present. Equilibration is then carried out in accordance with the preferred embodiment hereof, during the hydrolysis by the presence of about 2% sulphuric acid. When the hydrolysis is complete the copolymer is washed with water to a pH of 6 to 7 (essentially neutral) and the ether present is stripped therefrom. The copolymer is then sparged with nitrogen at a temperature of about 130° C. and filtered to obtain the desired repellent.

For the purpose of illustrating the various methods whereby the linear copolymers herein described may be prepared, the following examples are set forth:

Example 1.—Directed hydrolysis of chlorosilanes employing HCl evolution to cool reaction mixture;

Example 2.—Equilibration of cyclic copolymer containing both dimethylsiloxane and dihydrogensiloxane with sulfuric acid and end-blocker to control molecular weight;

Example 3.—The equilibration of a mixture of dihydrogencyclicpolysiloxane and dimethylcyclicpolysiloxane with sulfuric acid and end-blocker to control molecular weight; and Examples 4 to 9.—The hydrolysis at ice temperature or the presence of excess quantities of water.

It should be understand that these examples are for purposes of illustration and not of limitation.

EXAMPLE 1

A mixture of 29.9 pounds of isopropylether, 228.5 pounds of dimethyldichlorosilane, and 4.1 pounds of sulfuric acid were mixed in a kettle and 22.6 pounds of water were added thereto over a period of about one hour at an initial kettle temperature of 20° C. The evlution of hydrogen chloride which occurred during the hydrolysis lowered the temperature to about 0° C. When such temperature was attained, 1.08 pounds of trimethylchlorosilane and 12.9 pounds of 92% pure dichlorosilane were added. The impurity in the dichlorosilane was trichlorosilane. Additional water was then added until a total of 68 pounds had been added to the reaction mixture. Stirring was stopped and the mixture was permitted to settle after which the lower aqueous layer was withdrawn. The remaining upper layer was then washed with successive water additions until a neutralization point between 6 and 7 pH was obtained. The product was then heated to 130° C. and nitrogen was introduced for a period of one hour. The reaction mass was then cooled and filtered with carbon black and filter aid to produce a clear copolymeric liquid.

EXAMPLE 2

To demonstrate the manner in which the water repellents of the present invention may be prepared by equilibration of mixed cyclic polymers containing both dimethylsiloxane and dihydrogensiloxane units there is hereinafter set forth (A) the preparation of such cyclic materials in accordance with the method of our copending application for Letters Patent 505,842, filed May 3, 1955, and (B) the equilibration of such materials to the linear polysiloxane water repellent.

(A) Preparation of cyclic tetramer

A cold solution of 594 cc. (4.95 moles) of dimethyldichlorosilane and 165 g. (1.65 moles) of dichlorosilane dissolved in 500 cc. of diethyl ether was hydrolyzed by rapid addition from a dropping funnel with stirring to 2 kg. of crushed ice and 2500 cc. of diethyl ether. The hydrolysis mixture thus obtained was placed in a separatory funnel and the ether layer containing the cohydrolysis products was separated from the aqueous acid layer. After washing the ether layer with water and dilute sodium bicarbonate solution to remove traces of hydrochloric acid present the ether was removed from the cohydrolysis products by distillation up to a kettle temperature of 125° C. at atmospheric pressure. There was obtained 414 grams of a fluid cohydrolyzate containing 169 cc. hydrolyzable hydrogen/gram (theory=167 cc. hydrolyzable hydrogen/gram).

The cohydrolyzate was then distilled under reduced pressure to a kettle temperature of 150° C. at 1 mm. There was obtained 260.5 grams of volatile material containing 133 cc. of hydrolyzable hydrogen/gram and 150 grams of a residue containing 242 cc. hydrolyzable hydrogen/gram. The volatile material was fractionated under reduced pressure but no pure compounds could be obtained because of the difficulty in separation. However, on combining the fractions distilling below 72° C. at 17 mm. and fractionating this material at atmospheric pressure in a nitrogen atmosphere there was isolated a compound distilling at 156–158° C. This cut of the compound weighed 41 grams and contained 177 cc. hydrolyzable hydrogen/gram. It was identified as the mixed cyclic tetramer, [(Me$_2$SiO)$_3$ (H$_2$SiO)] containing [(Me$_2$SiO)$_2$ (H$_2$SiO)$_3$].

(B) Equilibration of the cyclic tetramer

To 20 g. (0.075 mole) of [(Me$_2$SiO)$_3$(H$_2$SiO)] there was added 0.36 g. (0.0022 mole) of hexamethyldisiloxane and 0.10 g. (0.5 wt. percent) of concentrated sulfuric acid. The mixture was agitated for 6 hours at room temperature to effect polymerization. The resulting polymeric oil was mixed with water to deactivate the catalyst and 100 cc. of isopropyl ether was added. The ether solution containing the copolymer was separated from the aqueous phase and washed with dilute sodium bicarbonate solution. The low boiling material was then removed at a temperature of about 150° C. at 1 mm. pressure. There resulted 18.5 grams of equilibrated linear copolymer with a viscosity of 135 cs. at 25° C. and containing 186.5 ml. per gram of silanic hydrogen (theory—167 ml. per gram of hydrolyzable hydrogen).

EXAMPLE 3

A mixture of 8 grams (0.17 mole of (H$_2$SiO) unit) of dihydrogencyclicpentamer (H$_2$SiO)$_5$ (prepared in accordance with the method of copending application for Letters Patent Ser. No. 505,842, filed May 3, 1955, whereby purified dichlorosilane is hydrolyzed in a hydrocarbon-ether solvent at ice temperature), 38 grams (0.51 mole of (CH$_3$)$_2$SiO unit) of dimethylcyclictetramer $$[(CH_3)_2SiO]_4$$

0.81 gram (0.005 mole) of hexamethyldisiloxane and 0.46 gram (1 wt. percent) of concentrated sulfuric acid was agitated for 5 hours. The oil was then shaken with water to deactivate the catalyst following which isopropyl alcohol was added and the ether solution was neutralized by addition of aqueous sodium bicarbonate. The neutral solution was then stripped to a kettle temperature of 150° C. at 1 mm. A linear copolymer having a viscosity of 84 centistokes at 25° C. and containing 177 cc./gram of hydrolyzable hydrogen (theory=167 cc./gram) was obtained.

Data demonstrating the results of various experiments in which the linear polymers were prepared directly from the respective silanes and in which the ratio of dichlorosilane to dimethylsilane was varied as set forth in Table 1. It will be observed that the cohydrolyzates were prepared from crude dichlorosilane which contained 17 mole percent trichlorosilane. Thus, because the trifunctional material was present the use of solvent and an end-blocker such as trimethylchlorosilane or esterification of the copolymer with ethanol was helpful in maintaining the viscosity of the resulting oil in a convenient workable range.

TABLE 1

| Example No. | Mole Ratio [c] $\frac{Me_2SiCl_2}{H_2SiCl_2}$ | Hydrolysis [a] Technique | Viscos. of Copolymers, cst. | Silanic $H_2$, cc./g. Found | Theory |
|---|---|---|---|---|---|
| 4 | 20:1 | (A) | 33 | 31 | 30 |
| 5 | 7.5:1 | (B) | 1,498 | 90 | 75 |
| 6 | 5:1 | (A) | 79 | 114 | 108 |
| 7 | 3:1 | [b] (C) | 55 | 191 | 169 |
| 8 | 3:1 | [b] (C) | 80 | 186.5 | 169 |

[a] (A)=Theoretical quantity of ethanol added followed by addition of 200-500% excess water at ice temperature. (B)=200-500% excess water added to chlorosilanes at ice temperatures. (C)=200-500% excess water added to an isopropyl alcohol solution of chlorosilanes at ice temperatures.
[b] 5% of end-blocker (trimethylchlorosilane) added.
[c] The dichlorosilane employed contained, as an impurity, 17 mole percent of trichlorosilane.

The linear dihydrogensiloxane-dimethylsiloxane copolymers prepared by any of the various methods herein described have excellent textile water repellent properties. Their effectiveness is particularly demonstrated by the spray rating test results obtained on laundered textiles which had been treated therewith.

The copolymers are effective at low concentrations and their ability to impart water repellency to fabrics does not appear to be appreciably influenced by molecular weight. Moreover, no significant difference in performance has been noted between cohydrolyzates and equilibrated copolymers. Small amounts of trifunctional units ($HSiO_{3/2}$) present in the cohydrolyzate appear to increase the effectiveness of the lower molecular weight resins.

It has been found that the ratio of dimethylsiloxane units to dihydrogensiloxane units in a given linear polymer is determinative, to a substantial extent, of the effectiveness of the compounds. Thus, while compounds containing a ratio of from about 50:1 to 1:1 dimethylsiloxane units to dihydrogensiloxane units are useful in accordance herewith, it is preferred to employ a ratio of from about 15:1 to about 2:1 and particularly from about 10:1 to about 3:1 respectively.

In Table 2 are set forth some data demonstrating the effectiveness of the compounds of the present invention as determined by the "spray rating test" (hereinafter defined). The products tested were those prepared in Examples 4 to 8 inclusive (Table 1).

TABLE 2

| Prod. From Experiment No. | Spray Ratings On— | | | | | |
|---|---|---|---|---|---|---|
| | Cotton Cloth | | | | Laundered Cotton Cloth | |
| | 2% Solution in Toluene | | 5% Solution in Toluene | | 2% Solution in Toluene | |
| | Brown | Green | Brown | Green | Brown | Green |
| 4 | | | | | 100 | 70 |
| 5 | | | | | 100 | 90 |
| 6 | 100 | 90 | 100 | 100 | | |
| 7 | 100 | 95 | | | | |
| 8 | | | | | 90 | 80 |

For the purpose of demonstrating the relative effectiveness of the linear water repellent materials employed in accordance herewith, water repellency comparisons were made between such polysiloxanes and somewhat similar materials comprising dimethylsiloxane and methylhydrogensiloxane units. These tests demonstrate not only the high degree of effectiveness of the hereindescribed polymers but also the ability of such polymers to cure at substantially lower temperatures than the polymers with which they are compared.

In order to have a fair comparison it was necessary to prepare a polysiloxane comprising the dihydrogensiloxane and methylhydrogensiloxane units having about the same viscosity and silicon to hydrogen ratio. The polymer employed in accordance with the present invention which was used in this comparison was prepared in accordance with the method of Example 1 above from a reaction mixture comprising a 15:1 ratio of dimethyldichlorosilane and dichlorosilane. The copolymer with which it was compared with prepared as follows:

A mixture of 7.7 grams of dodecamethylpentasiloxane $[Me_3SiO(Me_2SiO)_3SiMe_3]$, 78.4 grams of dimethylsiloxane cyclic tetramer which is $(Me_2SiO)_4$, 9.6 grams of a mixture of methylhydrogensiloxane cyclic compounds, i.e. $(MeSiHO)_x$, where $x$ may be 4 to 6 inclusive, and 1.5 grams (1.5 wt. percent) of 100% sulfuric acid were placed in a 250 cc. vessel, shaken and then allowed to stand for six hours. 75 cc. of water were then added followed by 100 cc. of ethyl ether. The mixture was again shaken, allowed to settle and the ether layer containing the silicone polymer was separated, washed with water until neutral and the ether was then removed under 0.5 mm. pressure up to a temperature of about 70° C. There was obtained 90.5 grams of a water white oil having a viscosity of 57 cstks. at 25° C.

The comparative physical properties of the two materials were as follows:

| | 15:1 [$(Me_2SiO)(H_2SiO)$] | 7:1 [$(Me_2SiO)(MeSiHO)$] |
|---|---|---|
| Viscosity, 25° C., cstks | 69 | 57 |
| Hydrolyzable $H_2$, cc./g.: | | |
| calculated | 40 | 37.5 |
| determined | 27.8±2 | 42 ±2 |

The copolymers were evaluated on a 50/50 viscose/acetate cloth as well as on kraft paper. The copolymers were first dissolved in toluene along with a 2% zinc octoate catalyst based on the weight of the copolymer. Eight inch square pieces of the cloth were immersed in 100 cc. of a 2 wt. percent solution of the copolymer in toluene and removed after a 30 second immersion. Excess solution was removed in a padder roll and the cloths were dried at 120° C. for 5 minutes following which they were cured at 160° C. for an additional 5 minutes. The laundering referred to in the following Table 3 consisted of ½ hour washings in 0.5 wt. percent Lux soap solution at 71° C. followed by a thorough rinsing, drying and ironing.

TABLE 3—SPRAY RATINGS

| Reference | Treatment | Initial | After Launderings | | | | |
|---|---|---|---|---|---|---|---|
| | | | 1 | 4 | 7 | 9 | 14 |
| 6026-11 | 15:1($Me_2SiO$) ($H_2SiO$) | 90+ 100 | 80 80 | 70+ 70 | 70 70 | 50 50-70 | 50→0 50→0 |
| 6026-23 | 7:1($Me_2SiO$) ($MeSiHO$) | 0 0 | 0 0 | | | | |

The significant thing to be noted from the foregoing is that the polysiloxanes employed in accordance with the present invention could be cured at the relatively low temperature of 160° C. for only 5 minutes to produce a highly water repellent material whereas the polysiloxane comprising the dimethylsiloxane and methylhydrogensiloxane units could not be cured at such temperature and, accordingly, the spray rating tests indicate complete failure for such material when cured at such temperature. No doubt at a substantially higher temperature the results would be somewhat different but since it is of utmost importance to lower the cure temperature and to eliminate as much high temperature treatment of fabrics as possible, the data are particularly significant.

The excellence of the dimethylsiloxane-dihydrogensiloxane-containing materials in the hydrophobing treatment of kraft paper is demonstrated by the data in the following Table 4. The treatment did not embody a heat cure of any kind and the water repellency was studied after room temperature drying only. The paper was treated by brushing with 1 wt. percent solutions of the copolymers which had been catalyzed with 2 wt. percent (based upon the weight of the copolymer) of zinc octoate. The loading employed was approximately 4 grams of the 1% solution per square foot of paper. Table 4 sets forth the visual observation of the treated papers after spraying with water for substantial periods of time.

TABLE 4

| Hours After Application | Observed Repellency | |
|---|---|---|
| | 15:1[(Me$_2$SiO):(H$_2$SiO)] | 7:1[Me$_2$SiO):(MeSiHO)] |
| 1 Hr | Very little | None. |
| 16 Hr | Some | Do. |
| 24 Hr | Good | Do. |
| 48 Hr | Good | Do. |
| 168 Hr | Very Good | Do. |
| 480 Hr | Excellent | Do. |

The "spray rating test" referred to in Tables 2 and 3 is the standard spray rating test (Government Specification CCC–T–191A, section IV, part 5, supplement 12). The test procedure is as follows:

The test specimen, usually a 7 x 7 in square piece of treated fabric, is fastened in a 6" metal hoop. The hoop is placed on a base stand with the fabric face upward at a 45° angle and 6" from a funnel equipped with a spray nozzle. Then 250 cc. of water at about 25° C. is poured into the funnel and allowed to spray on the fabric. The flow of water down the fabric is such that it coincides with the warp-wise direction of the sample. At the completion of the spraying period the hoop is inverted and tapped on one edge, rotated 180° C. and tapped once more. After tapping the spotted or wet pattern is compared with standards and assigned the rating of the standard to which it corresponds.

The cloths are then laundered using the "AATCC Standard Test Method 36–52," adapted for spray ratings. In this test the material is washed in an Atlas Launder-O-Meter for 90 min. at 71° C. using a 0.5% solution of P and G Oloate Soap in tap water. The cloths are thoroughly rinsed in tap water, padded, ironed lightly, and dried 5 min. at 100° C. Spray ratings are obtained again 4 hours after the drying period.

The various types of cloth successfully treated with the water repellent in accordance with the present invention include cotton (both poplin and Oxford), acetate, acetate viscose, silk, wool, nylon, Orlon, Dacron and dynel. In general, results were equal or superior to commercial water repellents with which these products were compared. Although the water repellency tests were excellent on all materials they were truly remarkable on the synthetics, Orlon and Dacron, as well as on silk. In some cases the treatment with the water repellent was still effective after eleven washings in the standard test.

In the tests herein described, rather than a 7 inch square piece, 8 inch square pieces of cloth were treated with the particular copolymer in question. The copolymer to be evaluated was emulsified first with water using a suitable emulsifier, e.g., Pluramine S–100, a quaternary amine type, or Antarox B–290, a non-ionic type, and diluted to a 2% polymer concentration. Many other emulsifiers may be used. The solution whether it be catalyzed or not, and the particular catalysts which may be employed will be hereinafter discussed, were applied to the cloth by immersing the same for at least one minute after which the cloth was squeezed through a hand wringer or a Butterworth padder. It was found that cloths squeezed through a hand wringer averaged about 25% more solution pick-up than those passed through the padder rolls. The weight percent wet pick-up based on cloth weight varied from about 40% to 100%. After padding the cloths were stretched on tenter frames to prevent shrinkage and then they were dried and cured. For the most part cloths were dried for 5 minutes at 120° C., followed by a 5 to 10 minute cure at 160° C. Following this cloths were conditioned at room temperature for at least 4 hours and then spray rated according to the standard spray test above referred to.

After the treatment of the cloth was complete the samples were laundered to test for durability of repellency. Laundering was done in either an "Easy Whirldry Washer" or an "Atlas Launder-O-Meter" for 1½ hours at 71° C. or in some instances for ½ hour at 49° C. The cloths were rinsed following the washings, squeezed, pressed lightly with a warm iron at 100–120° C. and oven dried for 5 minutes at 100° C. Samples were allowed to condition at room temperature for at least 4 hours and then spray rated again.

The amount of polymer in suitable carrier, e.g. water emulsion, an organic solvent such as naphtha, toluene, benzene, etc., required to impart a suitable water repellent film or coating to a fabric or paper may be varied from about 0.5% to about 5% by weight or more, e.g. as high as about 10% by weight. From about 1 or about 3% and specifically about 2% is a preferred amount for most textiles, with a somewhat lesser amount being employed in paper treatment. Thus, about a 1% concentration is preferred for treatment of most papers. Any suitable non-toxic carrier other than those above mentioned may be employed without departing from the spirit of the present invention.

It is of course well known that certain catalysts are effective in accelerating the cure of water repellent polymers of the type herein described. In particular it has been found that catalysts such as the soaps of zirconium, lead, zinc or cobalt and iron are effective. Zinc octoate is a preferred material in an amount of from about 0.1% to 3 wt. percent concentration. This percentage is based on the siloxane content of the treating solution or emulsion.

It should be understood that the herein described copolymers are extremely useful in the waterproofing of many different types of paper products. Thus, emulsions containing 1% of a copolymer prepared from dimethyldichlorosilane and dichlorosilane in water along with 2% of zinc added as zinc octosol based upon the amount of polymer in the emulsion, were sprayed onto a corrugated cardboard as it was formed in a corrugated cardboard manufacturing machine. Approximately 0.04 gram of the polymer was applied per square foot of treated cardboard. Generally the solution of silicone applied to a paper product to render the same water repellent is somewhat less than required for textiles. Thus, systems comprising from about 0.5% to about 3% by weight and preferably about 1% by weight of the polymer in solution is employed. Higher concentrations may of course be employed but from the standpoint of economy it is generally unnecessary and undesirable.

The application of the copolymer of the present invention even to blotter paper has been found to result in striking water repellency and has been found to be useful in printing advertising matter on blotter material.

Throughout the foregoing specification the copolymers of the present invention have been described as being prepared from dichlorosilane and dimethyldichlorosilane and it should be understood that instead of the chloro derivatives that the alkoxy derivatives of silane such as the diethoxysilane and dihydrogendiethoxysilane might be employed instead of the analogous chloro derivatives. Moreover, although the chlorinated derivatives, when employed, are preferred, it should be understood that the bromine derivatives are also useful in accordance herewith.

Having thus described our invention what we claim as novel and desire to protect by Letters Patent is as follows:

1. The method of rendering a fibrous material water repellent which method comprises treating such a material with a dilute system of a linear copolymeric polysiloxane having the general formula—

$$(R_3SiO)_z[Me_2SiO)_x(H_2SiO)_y](SiR_3)_z$$

wherein R is a monovalent hydrocarbon radical, $x$ is a positive integer from about 5 to about 1000, $y$ is a positive integer from about 2 to about 500 and $z$ is zero or 1, and $x$ bears a ratio to $y$ of from about 1 to 1 to about 50 to 1, said dilute system comprising from about 0.5% by weight to about 10% by weight of said copolymeric polysiloxane in a suitable liquid carrier, and curing the treated fibrous material.

2. The method of claim 1 wherein the carrier is water and the polysiloxane is emulsified therein.

3. The method of claim 1 wherein the carrier is toluene.

4. The method of claim 1 wherein $x$ is a positive integer from about 10 to 100, and wherein $y$ is a positive integer from 2 to 30.

5. The method of rendering a textile material water repellent which method comprises treating such a material with a dilute system of a linear copolymeric polysiloxane having the general formula—

$$(R_3SiO_z[(Me_2SiO)_x(H_2SiO)_y](SiR_3)_z$$

wherein R is a monovalent hydrocarbon radical, $x$ is a positive integer from about 5 to about 1000, $y$ is a positive integer from about 2 to about 500 and $z$ is zero or 1, and $x$ bears a ratio to $y$ of from about 1 to 1 to about 50 to 1, said dilute system comprising from about 0.5% by weight to about 10% by weight of said copolymeric polysiloxane in a suitable liquid carrier, and curing the treated textile material.

6. The method of claim 5 wherein the carrier comprises water and the polysiloxane is emulsified therein.

7. The method of claim 5 wherein the carrier is toluene.

8. The method of claim 5 wherein $x$ is a positive integer from about 10 to about 100 and wherein $y$ is a positive integer from about 2 to 30.

9. The method of rendering a paper product water repellent which method comprises treating such paper product with a dilute system of a linear copolymeric polysiloxane having the general formula—

$$(R_3SiO)_z[Me_2SiO)_x(H_2SiO)_y](SiR_3)_z$$

wherein R is a monovalent hydrocarbon radical, $x$ is a positive integer from about 5 to about 1000, $y$ is a positive integer from about 2 to about 500 and $z$ is zero or 1, and $x$ bears a ratio to $y$ of from about 1 to 1 to about 50 to 1, said dilute system comprising from about 0.5% by weight to about 10% by weight of said copolymeric polysiloxane in a suitable liquid carrier, and curing the treated paper product.

10. The method of claim 9 wherein the carrier comprises water and the polysiloxane is emulsified therein.

11. The method of claim 9 wherein the carrier is toluene.

12. The method of claim 9 wherein $x$ is a positive integer from about 10 to about 100, and wherein $y$ is a positive integer from about 2 to 30.

13. The method of claim 1 wherein the treated fibrous material is cured at a temperature from about room temperature to not more than about 160° C.

14. The method of claim 5 wherein the treated textile material is cured at a temperature of about 160° C. for about 5 minutes.

15. The method of claim 9 wherein the treated paper product is cured by drying at about room temperature.

References Cited in the file of this patent

UNITED STATES PATENTS

| 2,306,222 | Patrode | Dec. 22, 1942 |
| 2,380,996 | Rochow | Aug. 7, 1945 |
| 2,412,470 | Norton | Dec. 10, 1946 |
| 2,547,678 | Wilcock | Apr. 3, 1951 |
| 2,612,482 | Rasmussen | Sept. 30, 1952 |
| 2,615,824 | Minor | Oct. 28, 1952 |

FOREIGN PATENTS

| 645,768 | Great Briatin | Nov. 8, 1950 |

UNITED STATES PATENT OFFICE
CERTIFICATE OF CORRECTION

Patent No. 2,895,853                                    July 21, 1959

Donald L. Bailey et al.

It is hereby certified that error appears in the printed specification of the above numbered patent requiring correction and that the said Letters Patent should read as corrected below.

Column 9, lines 22 to 24, and lines 42 to 44, and column 10, line 13 to 14, each occurrence, the formula should appear as shown below instead of as in the patent:

$$(R_3SiO)_z[(Me_2SiO)_x(H_2SiO)_y](SiR_3)_z$$

Signed and sealed this 2nd day of August 1960.

(SEAL)
Attest:

KARL H. AXLINE
Attesting Officer

ROBERT C. WATSON
Commissioner of Patents